United States Patent [19]
Willis et al.

[11] Patent Number: 5,515,269
[45] Date of Patent: May 7, 1996

[54] METHOD OF PRODUCING A BILL OF MATERIAL FOR A CONFIGURED PRODUCT

[76] Inventors: Donald S. Willis, 2405 Warner Rd., Fort Worth, Tex. 76110; Robert A. Bascom, 1010 N. Glebe Rd., Suite 800, Arlington, Va. 22201

[21] Appl. No.: 148,962

[22] Filed: Nov. 8, 1993

[51] Int. Cl.$^6$ .................................................. G06F 153/00
[52] U.S. Cl. .................................... 364/401; 364/468
[58] Field of Search ................................. 364/401, 406, 364/408, 468

[56] References Cited

U.S. PATENT DOCUMENTS

| | | | |
|---|---|---|---|
| 4,459,663 | 7/1984 | Dye | 364/200 |
| 4,847,761 | 8/1989 | Ferriter et al. | 364/401 |
| 4,887,218 | 12/1989 | Natarajan | 364/468 |
| 5,109,337 | 4/1992 | Ferriter et al. | 364/401 |
| 5,119,307 | 6/1992 | Blaha et al. | 364/468 |
| 5,197,001 | 3/1993 | Mukherjee | 364/403 |
| 5,231,567 | 7/1993 | Matoba et al. | 364/401 |
| 5,237,495 | 8/1993 | Morii | 364/401 |
| 5,285,392 | 2/1994 | Kyle et al. | 364/468 |

FOREIGN PATENT DOCUMENTS

WO9100576  10/1991  WIPO.

OTHER PUBLICATIONS

Friedman & Associates, Inc., "The HFA ATO System" A New MRP Solution for Configuration–Oriented Manufacturers.

*Primary Examiner*—Gail O. Hayes
*Assistant Examiner*—Frantzy Poinvil

[57] ABSTRACT

This invention provides a method utilizing component-to-attribute relationships resulting in a bill of materials documenting the specific structure of the configuration of an end product. Attributes and their values together with option attributes which describe the end product are input to a database. A check is made to determine if dependent attributes are required to further define the end product. A check is then made to determine if incompatible attribute combinations exist. Components are selected to satisfy the specific structure of the configuration of the end product. Part numbers and nomenclature are created to identify the configuration just created. A bill of materials is created to document the specific structure of the end product together with price/cost of the end product.

34 Claims, 5 Drawing Sheets

METHOD OF PRODUCING A BILL OF MATERIAL FOR A CONFIGURED PRODUCT

FIELD OF THE INVENTION

This invention relates generally to product configurations. More particularly, but not by way of limitation, this invention relates to a method utilizing attribute relationships to document the structure of the configuration, e.g., bill of materials, pricing, warranty coverage, etc.

BACKGROUND OF THE INVENTION

The configure-to-order environment presents significant problems related to the structure of the products being produced, especially for heavily engineered products. There are generally a multitude of base components and options that can be combined to provide a finished product. Frequently there are incompatibilities and dependencies between the components and/or options available to produce the finished product. The task of documenting the structure, costs and prices of these combinations quickly becomes overwhelming. Furthermore, the need to create component combinations which meet marketing, sales, manufacturing and other objectives requires a common method of attribute and component description.

The previous approach to problems associated with heavily engineered products, which are required to fill many different specific needs and environments, is to utilize engineers or others trained in the technical aspects of the products being produced in order to develop the appropriate configuration of specific components for each individual requirement. These configurations can be developed by trained personnel on a case-by-case as-needed basis or the structures can be defined in advance by trained personnel. The terminology used to describe the products for marketing purposes often is not the same terminology used to describe the product for engineering and manufacturing purposes. This lack of common terminology results in errors when the product requirements are communicated from one function to another function.

In cases where configurations are determined on as-needed basis, trained personnel must always be available to develop the appropriate combination of specific components. Significant delays can occur when marketing/sales requirements and communications are not compatible with engineering and manufacturing.

If configurations are developed in advance of need, very significant amounts of time may be required of trained personnel. Additionally, many of the combinations created may never be sold, and they also present a formidable base of information that must be maintained as designs and markets change.

U.S. Pat. No. 4,847,761 discloses a process which can be utilized to either create structures on an as-needed basis or to structure every combination of specific components in advance of need. The method requires the "user" to manually ensure that only acceptable component combinations which meet all requirements are produced. In this world of ever-changing markets, materials, methods and government mandates, a method which requires an individual to personally and manually ensure conformation to all requirements is probably impossible. Furthermore, if all component combinations are to be described by this method in advance, it can present very intimidating storage and maintenance problems in all but the most trivial cases. Any change in the product makeup due to any of the above mentioned factors would require re-entry and re-creation of all affected products.

An improvement over the approach discussed above is to use a decision tree to document in advance-of-need all feasible component combinations. A decision tree depicts levels of decisions which may be made in creating component combinations. The first level would be a choice between one comparable set of components. The second level would be choices of components to add to the product based upon the component chosen at the first level. Additional levels continue until all necessary decisions have been made to describe a complete product. This method allows one to match the requirements of a given product order with the decision points of the decision tree. If a successful path in the tree is found then the appropriate already defined bill-of-material and product description are available. If a successful path is not found then the product is not producible for some reason.

A process based upon decision tree methods quite obviously requires very significant storage capabilities, tremendous effort to define all branches of the tree and exhaustive knowledge and accuracy to limit the decision tree to only producible products. Even in products with limited decision levels and components the decision tree can become very complex. A recent trial of this method resulted in a decision tree with hundreds of thousands of decision points and the method was abandoned as it appeared to be almost impossible to accurately create the particular decision tree and maintain same. Any changes in product design would have resulted in monumental rework of the decision tree. Furthermore, depiction or display of the decision tree for validation purposes was virtually impossible.

The need exists for an automated method to select specific components which will result in a product structure which will meet or exceed the requirements set forth in a purchase order received for a product and provide those components as a bill of material.

The present invention promotes configuration-to-order or as-needed by not requiring that every possible combination of specific components be determined in advance. Component-to-attribute relationships are utilized thereby not requiring that the relationship between all individual components be determined, either on a case-by-case or on an as-needed basis. Less input is required from personnel trained in the technical aspects of the products because technical personnel provide definitions for appropriate use of components, thereby allowing the frequent activity of configuration to be accomplished by non-technical personnel. For example, an automobile manufacturer can define the appropriate use for an engine as being for use in a vehicle of weight less than 2000 pounds rather than defining each specific use for the engine. The size of required information base which must be maintained as compared to currently available methods is reduced. Incompatibilities are defined based universally on attributes rather than on specific item by specific item. The present invention can be applied to product structure, cost and price which are all based on attributes but with different criteria. Unlimited levels of configured components are provided for in addition to a configured end item. Since no actual structures are developed in advance of need, storage and maintenance requirements are reduced dramatically. Since it is very easy to create configurations as required, by using the invention, configurations can be created, used and then discarded rather than being maintained until needed again. This invention easily supports effectivity based bill-of-material and engineering change notice systems. This invention also allows specific components to be easily added as needed, rather than requiring them to be defined in advance.

SUMMARY OF THE INVENTION

This invention provides a method utilizing component-to-attribute relationships resulting in a bill of materials documenting the specific structure of the configuration of an end product.

In one aspect, attributes and their values which describe the end product are input to a database and their validity is checked. Components are selected to satisfy the specific structure of the configuration of the end product. A bill of materials is created to document the specific structure of the end product together with price/cost of the attributes of the end product.

In another aspect, attributes and their values together with option attributes which describe the end product are input to a database and their validity is checked. A check is also made to determine if dependent attributes are required to further define the end product. A check is then made to determine if incompatible attribute combinations exist. Components are selected to satisfy the specific structure of the configuration of the end product. Part numbers and nomenclature are created to identify the configuration just created. A bill of materials is created to document the specific structure of the end product together with price/cost of the attributes of the end product.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
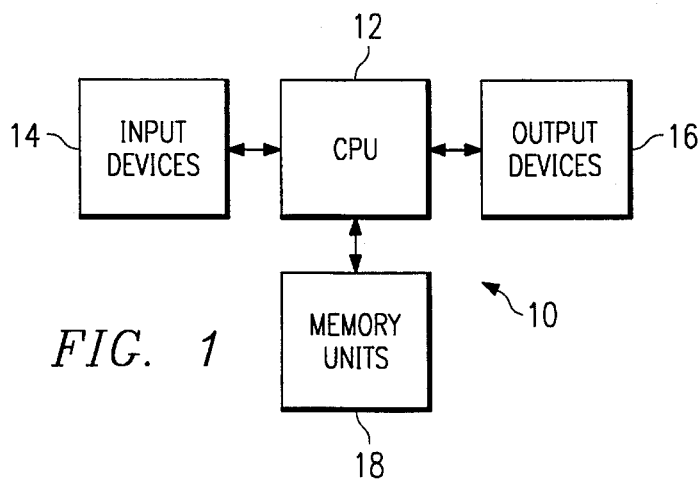
FIG. 1 is a simplified block diagram of an exemplary data processing system usable in performing the method of the present invention.

Although this invention is applicable to the selection of specific elements, components, etc. for the configuration of various products, it has been found particularly useful in the configure-to-order environment of commercial water heaters. Therefore, without limiting the applicability of the invention to "commercial water heaters" the invention will be described in such environment.

Some definition of terminology is in order. The term "attributes" or "product attributes" are those characteristics of a component or end item that are pertinent to selection, incompatibility and dependency. An example of an attribute or product attribute applicable to commercial water heaters might be "gallon size" while an attribute or product attribute applicable to an automobile might be "color". "Attribute values" are the specific values or a range of values associated with the particular attribute. Values can be numeric, descriptive or yes/no. An example of attribute value for the attribute "gallon size" would be "one thousand" while an attribute value for the attribute "color" would be "red".

Attributes can be divided into three types: basic, option (or optional) and dependent. "Basic attributes" are those which are common to all products of the product line or family. If we are configuring a commercial water heater, a basic attribute might be "energy type". If we are configuring an automobile, a basic attribute might be "body style". "Option attributes" are used to describe the requirement for options to be added to the end item. For the commercial water heater, an "option attribute" might be "extra insulation". For the automobile, an "option attribute" might be a "vinyl top". "Dependent attributes" are those characteristics for which the need can be inferred from the combination of basic and option attributes already designated. For the commercial water heater, if steam had been designated as the energy type, the "dependent attribute" would be the "psi of that steam". For the automobile, if the vinyl top had been ordered, the "dependent attribute" would be the "color" of the vinyl top. The value of the ability to infer when a dependent attribute is required is that the configuration only asks for the information required for the specific product being configured rather than always asking for every possible attribute and requiring the user to determine which attributes are not required.

"Component type" refers to a general family of items from which a specific component is selected. Component types represent the generic set of building blocks from which a higher level component or an end item can be produced. A specific component type can represent individual parts or sub assemblies or can represent a group of related or unrelated parts or assemblies that can be selected by the same set of attributes and attribute values. Just as end items can be configured based on attributes, so can any subassemblies which are incorporated into the end item. These subassemblies are called configured subassemblies. For the commercial water heater, a "component type" might be a "burner". For the automobile, a "component type" might be a "door". "Specific components" are the specific parts or assemblies. For the commercial water heater, a "specific component" might be a "particular size burner for an energy input of a certain range". For the automobile, a "specific component" might be the "right side doors" for a red four door 1991 Lincoln Continental Town Car. "Incompatibility" describes the situation where component types or specific components are not agreeable with one another. These incompatible situations are described in terms of attributes and attribute values. An example of attribute incompatibility for the commercial water heater might be an optional flue damper requested for an electric water heater. (An electric water heater does not have nor need a flue to vent stack gases.) For automobiles, a request for a deluxe interior might be incompatible with a utility vehicle model type. "Required components" are those components which ensure that a complete end item has been created by the inventive process. It is possible to define the set of required component types based on the set of attributes provided. For the commercial water heater, "required components" might be a tank, burner, etc. For the automobile, "required components" might be a body, doors, engine, transmission, interior, wheels, tires, differential and suspension. "Supplemental components" are those components, beyond the basic components, which may be added as the result of including some types of options. For the commercial water heater, "supplemental components" might be a temperature gauge, pressure gauge, etc. For the automobile, "supplemental components" might be front floor mats, rear floor mats, etc.

FIG. 1 illustrates an exemplary general purpose digital computer 10 used in the implementation of the present invention. Computer 10 includes a central processing unit (CPU) 12, input devices 14 (such as a keyboard), output devices 16 (such as a video display, printer, etc.) and memory units 18 etc., which are all operatively interconnected to operate in a well known manner.

The automated bill of material program is implemented using a database such as Paradox, SYBASE, DB2, etc. The specification and FIGURES provide sufficient information to enable a competent computer programmer or one of ordinary skill in the computer programming art, with possible assistance from a systems analyst, to readily generate the specific instruction set for programming a general purpose digital computer to make and use the present invention. The first step in the determination of the set of attributes that can be or can result in an end product is the "setup step or phase".

Figure 2:
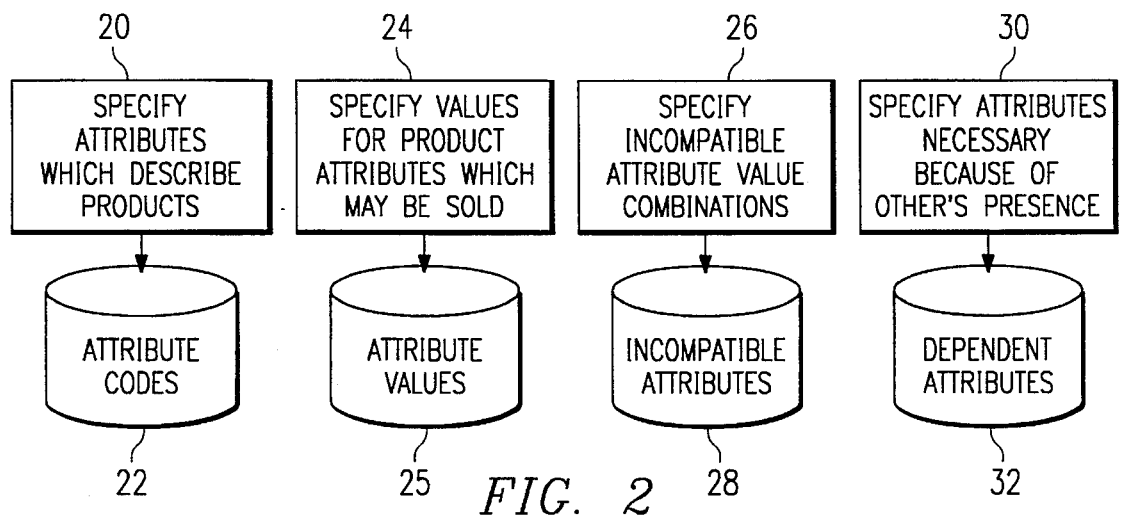
FIG. 2 is a simplified flow chart illustrating the first phase of the setup procedure in accordance with the present invention.

The first phase of the setup or setup procedure is the defining of the product attributes and will be discussed with reference to FIG. 2. In step 20, the attributes which are used to define the end products are specified and entered (via input devices 14) as attribute codes, together with a description, in a predetermined location in the attribute code file 22. Names or codes must be established for each attribute and should be short in order to ease data entry but may be descriptive to assist in later nomenclature development. An example of an attribute code would be "ETYPE" for energy type. In the preferred embodiment, these names or codes will also be used to construct nomenclatures for the configured assemblies and subassemblies. In step 24, the discrete values or value ranges for the attributes are specified and entered (via input devices 14) in a predetermined location in the attribute value file 25 and the unit of measure for the value or value range must also be established and entered. In step 26, incompatible attribute value combinations are specified and entered in a predetermined location in the incompatible attributes file 28. Incompatibilities are defined between pairs of attributes and the associated attribute values, value ranges, or Boolean "not" values or ranges. A descriptive reason as to why the attributes are incompatible in this situation is also specified. This reason is given as an explanation to the user when incompatible attributes are encountered. In step 30, dependent attributes (attributes which are necessary because of the presence of other attributes) are specified and entered in dependent attributes file 32. Dependent attribute situations (described in terms of attributes and their respective values or ranges) arise when a dependent attribute is required to define a complete and workable end product.

Figure 3:
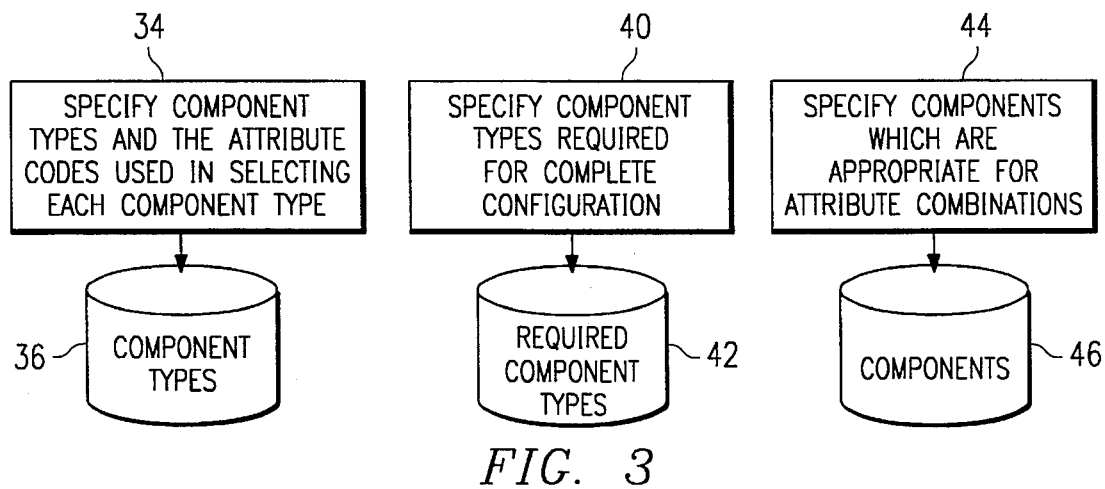
FIG. 3 is a simplified flow chart illustrating the second phase of the setup procedure in accordance with the present invention.

The second phase of the setup is the defining of the components to build the end products and will be discussed with reference to FIG. 3. In step 34, families of components with similar function, called component types, are specified in terms of codes and names and the attribute codes that will be used in selecting each component type are also specified. Both are entered into the component types file 36. The configuration process must determine when it has completed configuration of a finished end product or configured subassembly. Attribute codes and values are used to specify a range of products which would contain a given set of component types to create a viable configuration. For example, an automobile might require an energy/drive train assembly (component type), a compartment assembly (component type) and a trim package (component type) to be completely configured. These required component types, the attribute codes and values describing the products for which they are required and a code to indicate whether the thus specified configured item is a finished good or a configured subassembly (CSA) are specified in step 40 and entered into the required component types file 42. In step 44, components which are appropriate for attribute combinations are specified and entered in the components file 46. The definition of the component includes the part number, the component type of the part number and the attribute codes and values or ranges where this specific part number is applicable.

Figure 4:
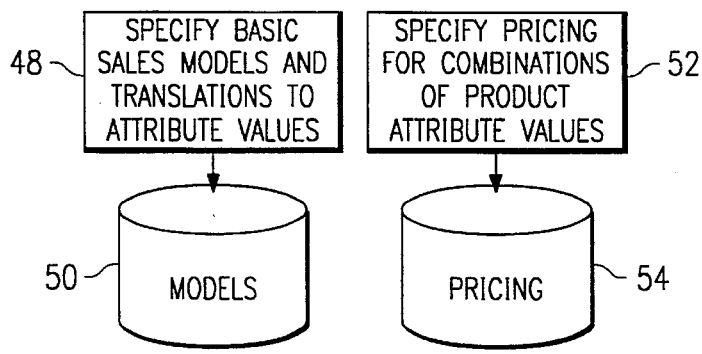
FIG. 4 is a simplified flow chart illustrating the third phase of the setup procedure in accordance with the present invention.

The third phase of the setup is the specifying of the sales models and pricing for the sales models and options and will be discussed with reference to FIG. 4. In step 48, attribute values are assigned to models or model numbers where employed to identify basic or standard end items or products and are entered into models file 50. In step 52, pricing for combinations of product attribute values are specified and entered in pricing file 54. Pricing is performed based on attributes in a fashion similar to the selection of components. The situations where a given price applies (e.g., a particular model) can be specified in terms of attributes and their associated values or value ranges.

After completion of the phases of the setup, the present invention is ready for the operational phase which results in a bill of materials for the specific structure of the product configuration.

Figure 5:
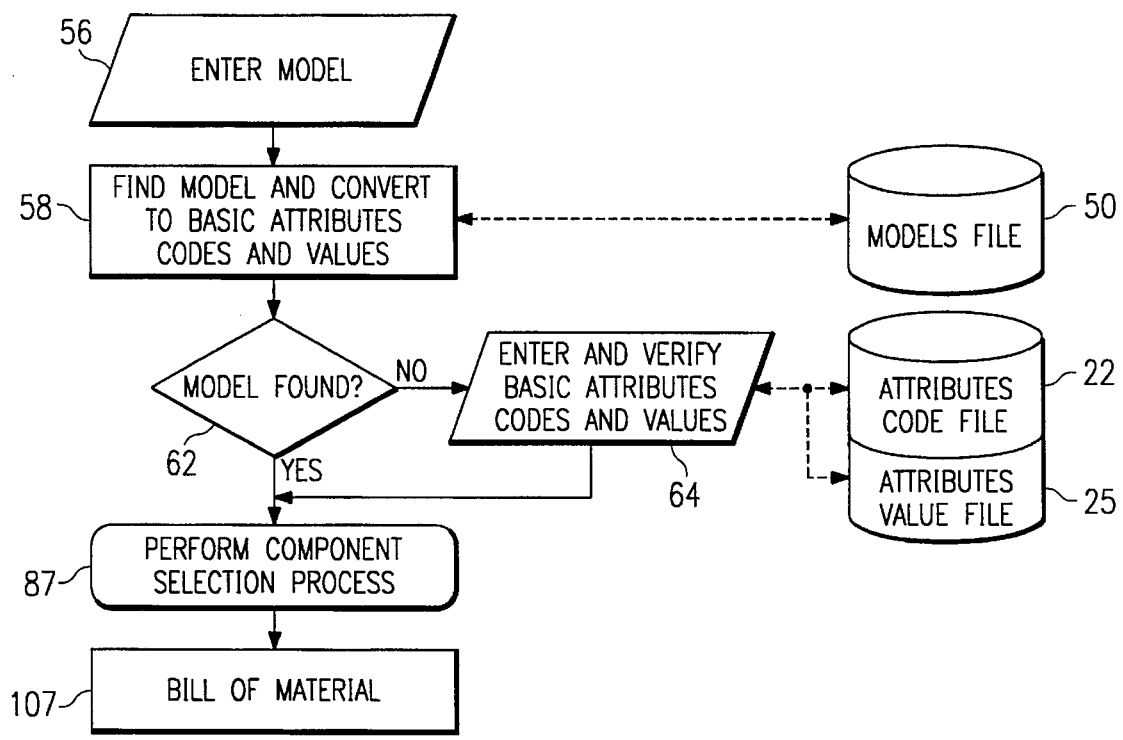
FIG. 5 is a simplified flow chart illustrating the sequence of the fundamental operation of the present invention.

With reference to an end product whose configuration is basic and uncomplicated, the operational phase of the fundamental or basic concept of the present invention will be discussed with reference to FIG. 5. When an order is received for a product or end item and that order is in the form of a particular Model No. which describes the ordered product which is to be configured, the Model No. is entered in step 56. In step 58, the Model No. which has been entered, is checked against Models File 50 to determine if there is a match. Models File 50 contains pre-defined sets of attributes and attribute values, corresponding to Model Nos., which describe commonly ordered products. A test is then made in decision step 62 to determine if the Model No. was or was not found in Models File 50. If a record is found in Models File 50 to match the Model No. entered in step 56, the basic attributes and attribute values required to describe the basic product being configured are provided by the Models File 50. If the Model No. was not found in the Models File 50, then the basic attributes and their values required to describe the product being configured are entered in step 64. The attributes and corresponding attribute values are verified against the attributes code file 22 and the attributes value file 25. Attributes code file 22 contains a list of all valid attributes and the attributes value file 25 contains a list of the valid discrete attribute values or attribute value ranges. After the basic attributes and their values have been entered, the component selection process is performed in step 87 and a bill of material 107 is created for the end product.

Figure 6A:
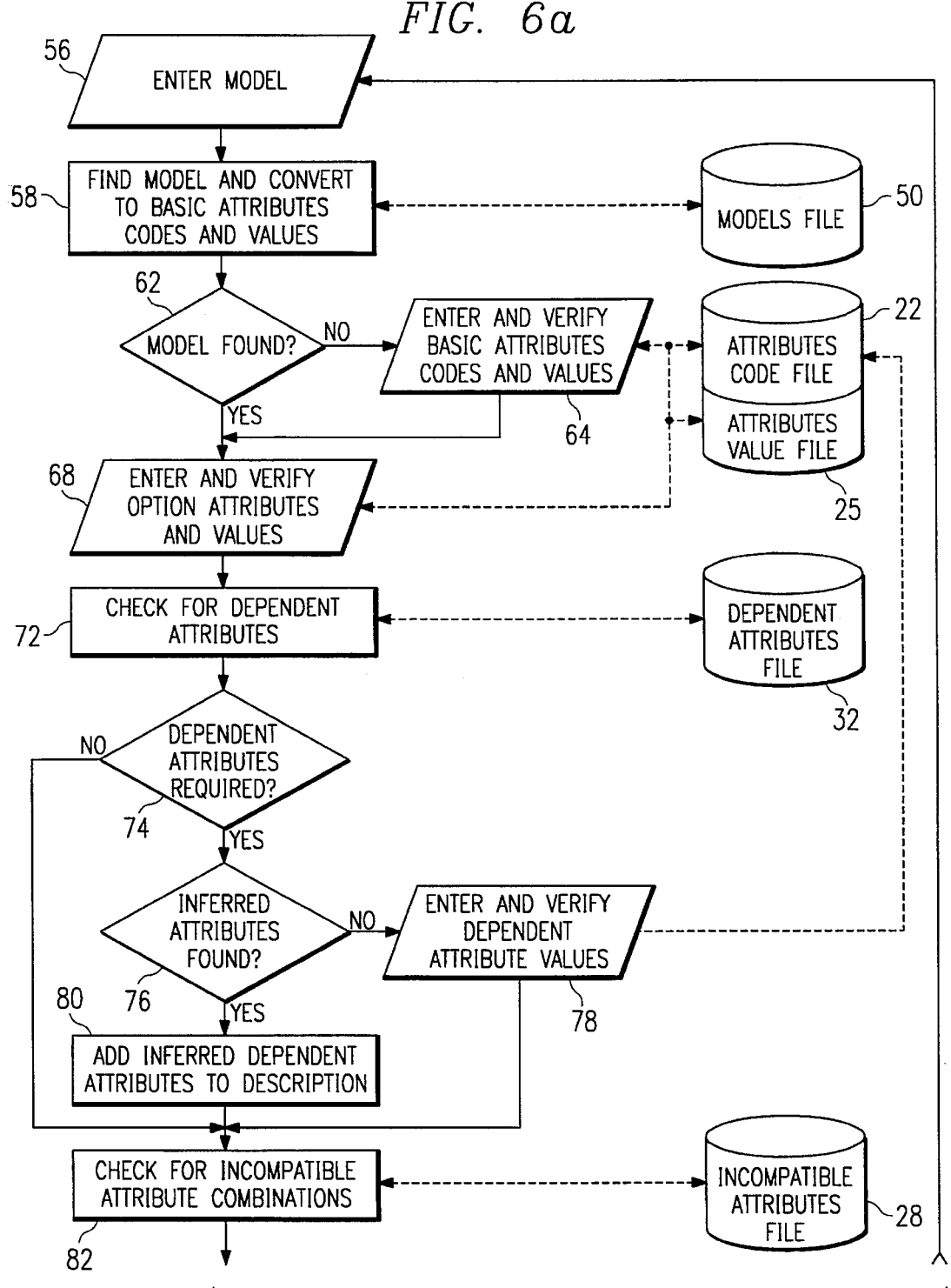
FIGS. 6a and 6b are simplified flow charts illustrating a first portion of the sequence of expanded operation of the present invention.
Figure 6B:
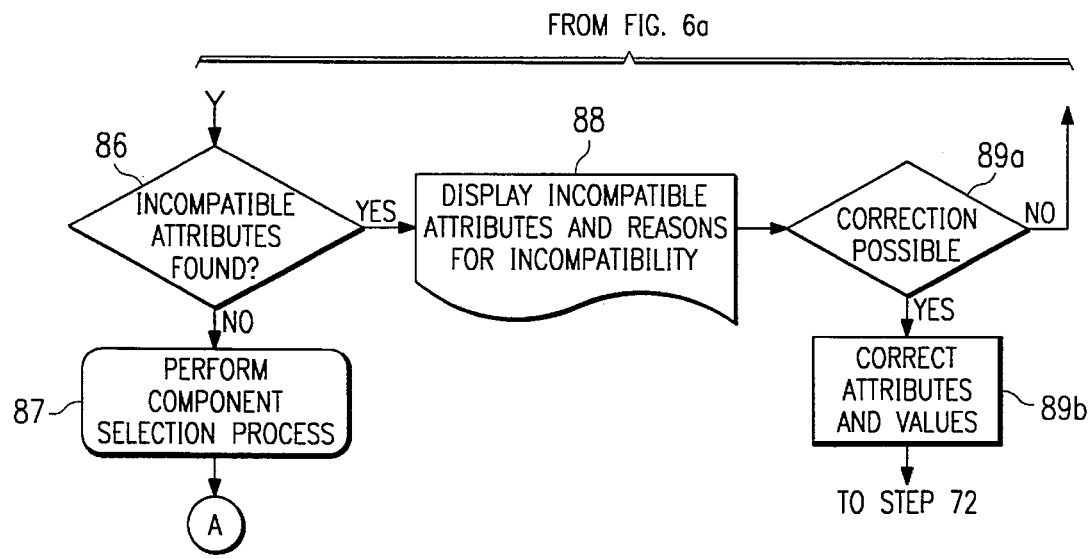

For an end product which is more complex with many optional, dependent and inferred features or elements, the operational phase of the present invention is expanded and will be discussed with reference to FIGS. 6a and 6b. Again, when an order is received for a product or end item and that order is in the form of a particular Model No. which describes the ordered product which is to be configured, the Model No. is entered in step 56. In step 58, the Model No. which has been entered, is checked against Models File 50 to determine if there is a match. Models File 50 contains pre-defined sets of attributes and attribute values, corresponding to Model Nos., which describe commonly ordered products. A test is then made in decision step 62 to determine if the Model No. was or was not found in Models File 50. If a record is found in Models File 50 to match the Model No. entered in step 56, the basic attributes and attribute values required to describe the basic product being configured are provided by the Models File 50. If the Model No. was not found in the Models File 50, then the basic attributes and their values required to describe the product being configured are entered in step 64. The attributes and corresponding attribute values are verified against the attributes code file 22 and the attributes value file 25. Attributes code file 22 contains a list of all valid attributes and the attribute value files 25 contains a list of the valid discrete attribute values or attribute value ranges.

Any optional features ordered on the product being configured are described in terms of option attributes and their assumed YES values and are entered in step 68. Options are defined as any item that is not required to configure a complete final assembly. Option attributes and their corresponding values are verified against the attributes code file 22 and the attributes value file 25. In most instances, the basic and option attributes and their values will fully describe the item being configured. However, the basic and option attributes and their values are checked in combination to determine if further descriptive information is required. Situations of incomplete description are defined by combinations of attributes and attribute values. When a match is made of an instance of incomplete definition, the need for further information (dependent attributes) is identified.

The dependent attributes file 32 contains definitions of the instances when further descriptive information is required, as well as specifying the type of additional information required (the dependent attribute). In some instances, the dependent attribute as well as its value can be determined from the combination of basic and option attributes and their values. This class of dependent attributes is referred to as inferred attributes. After step 68, a check is made in step 72 of the information returned to determine if dependent attributes are required. A test is then made in decision step 74 to determine if dependent attributes are required. If the result of the test in step 74 is YES, then a test is made in decision step 76 to determine if inferred attributes were found. If the result of the test in step 76 is NO, then dependent attribute values are entered by the user in step 78 and the values are validated against the acceptable values contained in the attributes value file 25. If the result of the test in step 76 is YES, then the inferred dependent attribute value is added in step 80. If the result of the test in step 74 is NO, then steps 76, 78 and 80 are by-passed.

In step 82, the attributes with their corresponding values are checked against each other and against acceptable values contained in the incompatible attributes file 28 to determine if incompatible combinations of attributes and their associated attribute values have been entered. The incompatible attributes file 28 identifies combinations of attributes and their associated values that are incompatible with other attributes and their values. For each instance of incompatibility, the reason for the incompatibility is also stored in this file. If one or more instances of incompatibility are found, the attributes and values are not acceptable for configuration. For the automobile, all four cylinder engines can be defined as being "incompatible" with all Lincoln Town Car body styles.

A test is then made in decision step 86 to determine if instances of incompatibility are found. If the result of the test in step 86 is YES, the incompatible attributes and their values are displayed in step 88 along with the reason for incompatibility. An option to correct the attributes and/or attribute values is then provided in step 89a. If correction is not possible, the system is returned to the initial step 56. If correction is possible, the attribute and attribute values may be corrected in step 89b and the user is returned to step 72. If the result of the test in step 86 is NO, then a complete and compatible set of attributes and attribute values is available and configuration is initiated by branching to the subroutine labeled A (FIG. 7) and performing the component selection process in step 87.

Figure 7:
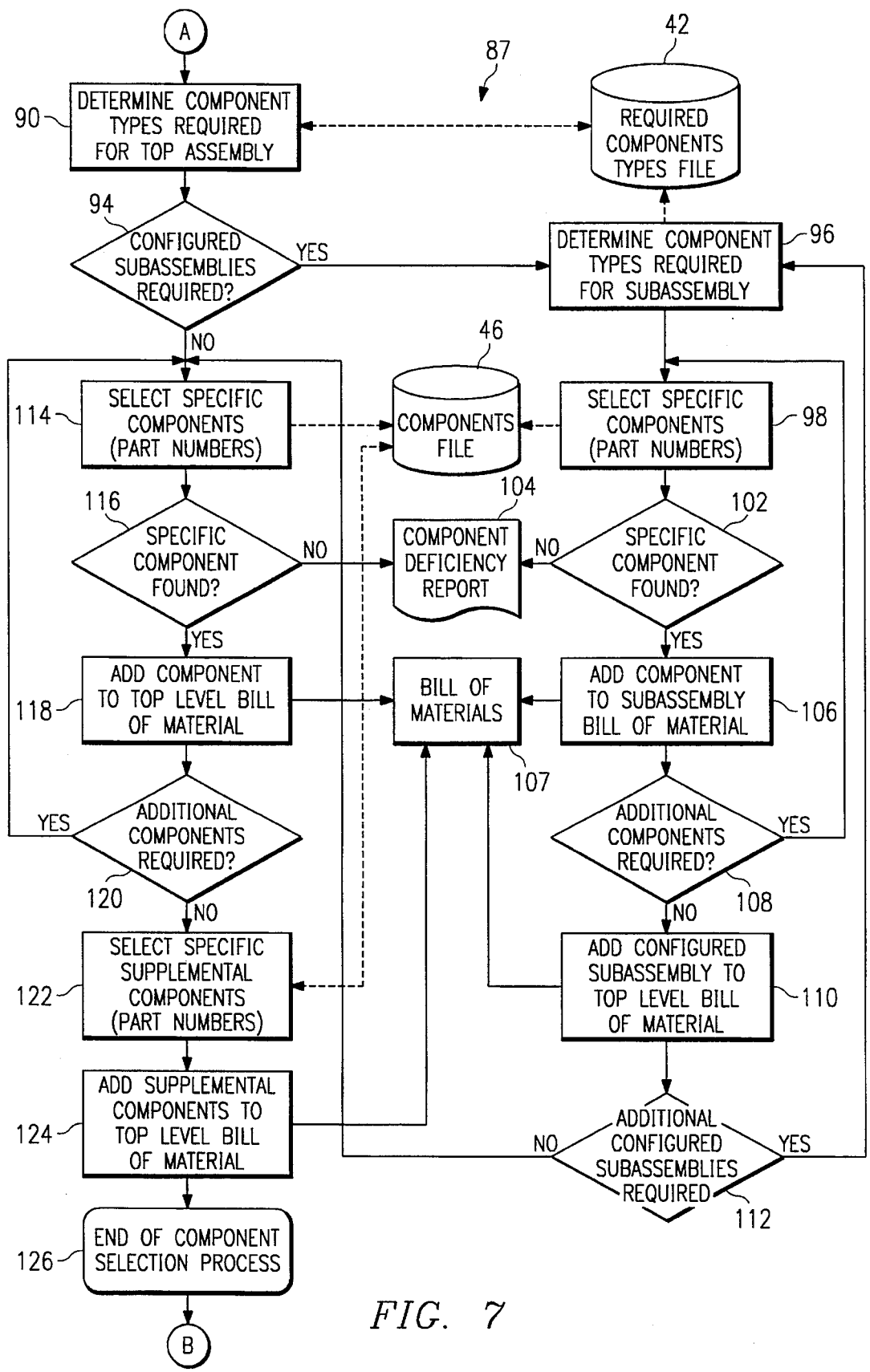
FIG. 7 is a simplified flow chart illustrating a second portion of the sequence of expanded operation of the present invention.

In step 90 of FIG. 7, the basic, option and dependent attributes and their values are matched against the required component types file 42 to determine the set of component types required to satisfy the desired top level configuration. The required component types file 42 consists of valid sets of component types that will produce a complete top level assembly or a configured subassembly. Each set of component types is described in terms of the attributes and associated attribute values or value ranges for which it is applicable. A test or check is then made, in decision step 94, of the required component types to determine if one or more are subassemblies that must be configured. These are configured subassemblies or CSA's. If the result in step 94 is YES, the component types required for the subassembly are determined in step 96. The component types necessary to complete the configured subassembly are determined by matching the attributes and their values against the required component types file 42 to determine the set of component types required to satisfy the configured subassembly. When determining the component types required to satisfy a configured subassembly, the configured subassembly component type and its associated identifying attributes and attribute values are used in the selection process.

In step 98, the specific components (part numbers) are selected to meet the requirements of each component type required for the configured subassembly. Specific components are selected by matching the component type required and its associated attributes and attribute values or ranges of values to the applicability of the specific component found in components file 46. It is in this step 98 that the actual part numbers are selected. The components file 46 consists of specific components (part numbers) identified by component type and the attributes and associated attribute values, or value ranges, for which each specific component is applicable. A test or check is then made in decision step 102 to determine if the specific component was found in components file 46.

If the result of the test in step 102 is NO and a matching component is not found in the components file 46, a deficiency report is created in step 104. The deficiency report shows the subassembly being configured, the component type that could not be fulfilled, and the attribute types and values of the unsuccessful component type match. This report notifies the user of what component or components must be created or modified to satisfy this requirement.

Additionally, this approach allows the user to build the components file as it becomes required, versus defining the entire universe of components in advance of need.

If the result of the test in step 102 is YES, the matched component is added, in step 106, to the bill of material 107 for the subassembly being configured.

A test or check is then made in decision step 108 to determine if additional components are required to fully satisfy the subassembly currently being created. If the result of the test of step 108 is YES, then steps 98 through 108 are repeated until the result of the test in step 108 is NO. When the result of the test of step 108 is NO, the configured subassembly is added, in step 110, to the bill of material 107 for the assembly being configured.

A test or check is then made in decision step 112 to determine if additional configured subassemblies are required to satisfy the requirements of the top level assembly being configured. If the result of the test of step 112 is YES, then steps 96 through 112 are repeated until the result of the test in step 112 is NO. When the result of the test of step 112 is NO, specific components (part numbers) for the assembly are selected in step 114 to meet the requirements of each component type required for the assembly. It will be appreciated that if and when the result of the test in step 94 is NO, the process also proceeds to step 114.

Specific components for the assembly are selected by matching the component type required and its associated attributes and attribute values or ranges of values to the applicability of the specific component found in components file 46. It is in this step 114 that the actual part numbers are selected.

A test or check is then made in decision step 116 to determine if the specific component was found in components file 46. If the result of the test in step 116 is NO and a matching component is not found in the components file 46, a deficiency report is created in step 104.

If the result of the test in step 116 is YES, the matched component is added, in step 118, to the bill of material 107 for the assembly being configured.

A test or check is then made in decision step 120 to determine if additional components are required to fully satisfy the requirements of the top level assembly being configured. If the result of the test of step 120 is YES, then steps 114 through 120 are repeated until the result of the test in step 120 is NO. When the result of the test of step 120 is NO, specific supplemental components may be selected, in step 122, from the components file 46 to meet any unsatisfied option requirements. Supplemental components are selected by matching the attributes and attribute values or ranges of values to the applicability of specific supplemental component types in the components file 46. It is in this step 122 that the actual part numbers are selected.

In step 124, any supplemental component or components are added to the top level bill of material 107 for the assembly being configured.

Figure 8:
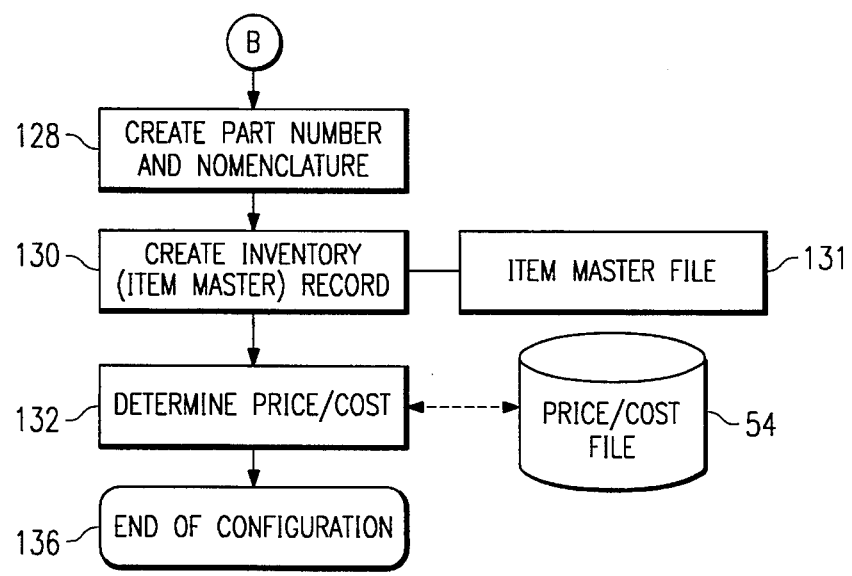
FIG. 8 is a simplified flow chart illustrating a third portion of the sequence of expanded operation of the present invention.

The component selection process is completed with step 126 once all levels (top and subassemblies) and any supplemental component requirements have been satisfied by component selection or creation of a deficiency report record and the operation branches to the subroutine labeled B in FIG. 8.

In step 128 of FIG. 8, part numbers are created to identify the assembly and configured subassemblies just created. The nomenclatures for these part numbers are derived from the attributes and attribute values used to describe the assembly and configured subassemblies. For the automobile, the assembly description could be "91 Town Car, 4 door, 302 CID engine, 4 speed automatic transmission, etc.

In step 130, inventory records are created and stored in the Item Master file 131 for the assembly and configured subassemblies configured to accommodate this requirement.

In step 132, the attributes and attribute values of the configured product are checked against the pricing/costing file 54 to determine prices and costs for material, labor, overhead, warranty, etc., in a manner similar to the component selection process. In the pricing/costing process, however, price/cost components are selected instead of the physical part numbers used to actually construct the product. The pricing/costing logic may or may not follow the same logic as was used in the physical configuration process. The pricing/costing file 54 contains prices (and costs, if desired) for attributes within specific values, value ranges and attribute combinations.

The configuration process is concluded in step 136.

NONPRINTED APPENDICE APPEARING IN SUBJECT PATENT FILE

Appendix A is a printout of various files of the present invention associated with the specific structure of the configuration of a limited portion of GM automobiles.

While the invention has been particularly shown and described with reference to the preferred embodiment thereof, it will be understood by those persons skilled in the art that various changes in the form and details may be made without departing from the scope and spirit of the invention as defined in the appended claims.

We claim:

1. A method employing a computer and database techniques and utilizing component-to-attribute relationships resulting in a bill of materials documenting the specific structure of the configuration of an end product which has been ordered, said method comprising the steps of:

(a) generating a database of files which define the scope and variety of end products which may be configured in terms of attributes and attribute values;

(b) inputting into the computer via an input device attributes and their values which are required to describe the end product being configured;

(c) searching the database to verify the attributes and their values against previously determined valid attributes and their values;

(d) selecting from the database components to satisfy the specific structure of the configuration of the end product;

(e) searching the required components database and the results of step (d) to verify that all required component types have been selected to create a complete end product;

(f) generating a list of required component types not selected in step (e) if a complete end product has not been created; and (g) generating a bill of materials and nomenclature for the end product.

2. The method of claim 1 further including the steps of:

inputting into the computer via the input device the model number of an end product;

searching the database to verify the model number against previously determined valid model numbers and retrieving the corresponding attributes and attribute values; and inputting into the computer via the input device attributes and their values which are required to describe the product being configured if the model number was not valid.

3. The method of claim 1 wherein said selection of components includes the steps of:

searching the database to determine component types required to satisfy the desired configuration;

accessing the database to check the required component types to determine if one or more of the required component types are subassemblies which must be configured;

searching the database to determine component types required for subassembly if subassemblies must be configured;

selecting from the database specific components to meet the requirements of each component type required for the configured subassembly; and generating a deficiency report if a specific component which satisfies the requirements can not be found.

4. The method of claim 3 further including the steps of:

appending of specific components to the subassembly bill of material if the specific components are found which satisfies the requirements;

accessing the database to determine if additional specific components are required to satisfy the subassembly currently being created;

repeating the previous four steps, if additional specific components are required, until additional specific components are not required;

appending of configured subassembly to bill of material;

accessing the database to determine if additional configured subassemblies are required;

repeating the previous eight steps, if additional configured subassemblies are required, until additional configured subassemblies are not required;

selecting from the database specific components to meet the requirements of each required component type; and generating a deficiency report if a specific component which satisfies the component type and attribute values can not be found.

5. The method of claim 4 further including the steps of:

appending of valid specific components to the bill of material for the product being configured if the specific components are found which satisfies the requirements;

accessing the database to determine if additional specific components are required for the top level assembly being configured;

repeating the previous four steps, if additional specific components are required, until additional specific components are not required;

selecting from the database specific supplemental components to meet the option requirements, as required; and appending of the specific supplemental components to the bill of material for the product being configured.

6. The method of claim 5 further including the steps of:

generating part numbers and nomenclatures to identify the assembly and configured subassemblies just created;

generating item master records for the assembly and configured subassemblies; and searching the database to determine price/cost values for the assembly just configured based on the attributes and attribute values.

7. The method of claim 1 wherein said selection of components includes the steps of:

searching the database to determine component types required to satisfy the desired configuration;

accessing the database to check the required component types to determine if one or more of the required component types are subassemblies which must be configured;

selecting from the database specific components to meet the requirements of each required component type if configured subassemblies are not required; and generating a deficiency report if a specific component meeting the component type and attribute values can not be found.

8. The method of claim 7 further including the steps of:

appending of the valid specific components to the bill of material for the product being configured if the specific components are found which satisfies the requirements;

accessing the database to determine if additional specific components are required for the top level assembly being configured;

repeating the previous four steps, if additional specific components are required, until additional specific components are not required;

selecting from the database specific supplemental components to meet the option requirements; and appending the specific supplemental components to the bill of material for the product being configured.

9. The method of claim 8 further including the steps of:

generating part numbers and nomenclatures to identify the assembly and configured subassemblies just created;

generating item master records for the assembly and configured subassemblies; and searching the database to determine price/cost values for the configured assemblies based on the attributes and attribute values.

10. The method of claim 1 further including the following steps performed after step (c) and before step (d):

($c_1$) inputting into the computer via the input device option attributes and their values which define any optional features required for the end product; and ($c_2$) searching the database to verify the option attributes and their values against previously determined valid option attributes and their values.

11. The method of claim 10 further including the following step performed after step ($c_2$):

($c_3$) accessing the database to determine if dependent attributes are required to be input to further define the end product.

12. The method of claim 11 further including the following steps performed after step ($c_3$):

($c_4$) accessing the database to determine if incompatible attribute combinations exist;

($c_5$) displaying to an output device the incompatible attributes and their values together with the reason for incompatibility when incompatible attribute combinations exist; and ($c_6$) correcting via the input device the attributes and their values if correction is possible.

13. The method of claim 11 further including the following step performed after step ($c_3$):

($c_4$) accessing the database to determine if inferred attributes are found if dependent attributes are required.

14. The method of claim 13 further including the following steps performed after step ($c_4$):

($c_5$) inputting into the computer via the input device dependent attributes and their values if inferred attributes are not found; and ($c_6$) searching the database to verify the dependent attributes and their values against previously determined valid dependent attributes and their values if dependent attributes are input.

15. The method of claim 14 further including the following steps performed after step ($c_6$):

($c_7$) accessing the database to determine if incompatible attribute combinations exist;

($c_8$) displaying to an output device the incompatible attributes and their values together with the reason for incompatibility when incompatible attribute combinations exist; and ($c_9$) correcting via the input device the attributes and their values if correction is possible.

16. The method of claim 13 further including the following step performed after step ($c_4$):

($c_5$) inputting into the computer via the input device inferred dependent attributes and their values if inferred attributes are found.

17. The method of claim 16 further including the following steps performed after step ($c_5$):

($c_6$) accessing the database to determine if incompatible attribute combinations exist;

($c_7$) displaying to an output device the incompatible attributes and their values together with the reason for incompatibility when incompatible attribute combinations exist; and ($c_8$) correcting via the input device the attributes and their values if correction is possible.

18. The method of claim 1 wherein said database of files includes at least an attribute codes file, an attribute values file, an incompatible attributes file, a dependent attributes file, a component types file, a required component types file, a components file, a models file and a pricing file.

19. The method of claim 1 further including the step of:

searching the database to determine price/cost values for the end product configured based on the attributes and attribute values.

20. A method employing a computer and database techniques and utilizing component-to-attribute relationships resulting in a bill of materials documenting the specific structure of the configuration of an end product which has been ordered, said method comprising the steps of:

generating a database of files which define the scope and variety of end products which may be configured in terms of attributes and attribute values;

inputting into the computer via an input device attributes and their values which are required to describe the end product being configured;

searching the database to verify the attributes and their values against previously determined valid attributes and their values;

inputting into the computer via the input device option attributes and their values which define any optional features required for the end product;

searching the database to verify the option attributes and their values against previously determined valid option attributes and their values;

accessing the database to determine if dependent attributes are required to be input to further define the end product;

accessing the database to determine if inferred attributes are found if dependent attributes are required;

inputting into the computer via the input device dependent attributes and their values if inferred attributes are not found;

searching the database to verify the dependent attributes and their values against previously determined valid dependent attributes and their values;

accessing the database to determine if incompatible attribute combinations exist;

displaying to an output device the incompatible attributes and their values together with the reason for incompatibility when incompatible attribute combinations exist; and correcting via the input device the attributes and their values if correction is possible.

21. The method of claim 20 further including the steps of:

inputting into the computer via the input device the model number of an end product;

searching the database to verify the model number against previously determined valid model numbers and retrieving the corresponding attributes and attribute values; and inputting into the computer via the input device attributes and their values which are required to describe the product being configured if the model number was not valid.

22. The method of claim 20 further including the step of:

selecting from the database components to satisfy the specific structure of the configuration of the end product if incompatible attributes do not exist.

23. The method of claim 22 further including the step of:

generating a bill of materials for the end product.

24. The method of claim 22 wherein said selection of components includes the steps of:

searching the database to determine component types required to satisfy the desired configuration;

accessing the database to check the required component types to determine if one or more of the required component types are subassemblies which must be configured;

accessing the database to determine component types required for subassembly if subassemblies must be configured;

selecting from the database specific components to meet the requirements of each component type required for the configured subassembly; and generating a deficiency report if a specific component meeting the component type and attribute value requirements can not be found.

25. The method of claim 24 further including the steps of:

appending the specific components to the subassembly bill of material if the specific components are found which satisfies the requirements;

accessing the database to determine if additional specific components are required to satisfy the subassembly currently being created;

repeating the previous four steps, if additional specific components are required, until additional specific components are not required;

appending configured subassembly to bill of material;

accessing the database to determine if additional configured subassemblies are required;

repeating the previous eight steps, if additional configured subassemblies are required, until additional configured subassemblies are not required;

selecting from the database specific components to meet the requirements of each required component type; and generating a deficiency report if a specific component which satisfies the component type and attribute values can not be found.

26. The method of claim 25 further including the steps of:

appending the valid specific components to the bill of material for the product being configured if the specific components are found which satisfies the requirements;

accessing the database to determine if additional specific components are required for the top level assembly being configured;

repeating the previous four steps, if additional specific components are required, until additional specific components are not required;

selecting from the database specific supplemental components, as required, to meet the option requirements; and appending the specific supplemental components to the bill of material for the product being configured.

27. The method of claim 26 further including the steps of:

generating part numbers and nomenclatures to identify the assembly and configured subassemblies just created;

generating item master records for the assembly and configured subassemblies; and searching the database to determine price/cost values for the assemblies configured based on the attributes and attribute values.

28. The method of claim 22 wherein said selection of components includes the steps of:

searching the database to determine component types required to satisfy the desired configuration;

accessing the database to check the required component types to determine if one or more of the required component types are subassemblies which must be configured;

selecting from the database specific components to meet the requirements of each required component type if configured subassemblies are not required; and generating a deficiency report if specific components meeting the component type and attribute values can not be found.

29. The method of claim 28 further including the steps of:

appending of the valid specific components to the bill of material for the product being configured if the specific components are found which satisfies the requirements;

accessing the database to determine if additional specific components are required for the top level assembly being configured;

repeating the previous four steps, if additional specific components are required, until additional specific components are not required;

selecting from the database specific supplemental components to meet the option requirements; and appending of the specific supplemental components to the bill of material for the product being configured.

30. The method of claim 29 further including the steps of:

generating part numbers and nomenclatures to identify the assembly and configured subassemblies just created;

generating item master records for the assembly and configured subassemblies; and searching the database to determine price/cost values for the assemblies configured based on the attributes and attribute values.

31. The method of claim 20 wherein said database of files includes at least an attribute codes file, an attribute values file, an incompatible attributes file, a dependent attributes file, a component types file, a required component types file, a components file, a models file and a pricing file.

32. The method of claim 22 further including the step of:

searching the database to verify that the components selected create a complete end product.

33. A method employing a computer and database techniques and utilizing component-to-attribute relationships resulting in a bill of materials documenting the specific structure of the configuration of an end product which has been ordered, said method comprising the steps of:

(a) generating a database of files which define the scope and variety of end products which may be configured in terms of attributes and attribute values;

(b) inputting into the computer via an input device attributes and their values which are required to describe the end product being configured;

(c) searching the database to verify the attributes and their values against previously determined valid attributes and their values;

(d) inputting into the computer via the input device option attributes and their values which define any optional features required for the end product;

(e) searching the database to verify the option attributes and their values against previously determined valid option attributes and their values;

(f) accessing the database to determine if dependent attributes are required to be input to further define the end product;

(g) accessing the database to determine if inferred attributes are found if dependent attributes are required;

(h) selecting from the database components to satisfy the specific structure of the configuration of the end product;

(i) searching the database to verify that the components selected create a complete end product; and (j) generating a bill of materials and nomenclature for the end product.

34. A method employing a computer and database techniques and utilizing component-to-attribute relationships resulting in a bill of materials documenting the specific structure of the configuration of an end product which has been ordered, said method comprising the steps of:

(a) generating a database of files which define the scope and variety of end products which may be configured in terms of attributes and attribute values, said database of files includes at least an attribute codes file, an attribute values file, an incompatible attributes file, a dependent attributes file, a component types file, a required component types file, a components file, a models file and a pricing file;

(b) inputting into the computer via an input device attributes and their values which are required to describe the end product being configured;

(c) searching the database to verify the attributes and their values against previously determined valid attributes and their values;

(d) selecting from the database components to satisfy the specific structure of the configuration of the end product;

(e) searching the database to verify that the components selected create a complete end product; and (f) generating a bill of materials and nomenclature for the end product.

* * * * *